US006884946B2

United States Patent
Miller et al.

(10) Patent No.: US 6,884,946 B2
(45) Date of Patent: Apr. 26, 2005

(54) SCALE FOR WEIGHING AND DETERMINING A PRICE OF AN ITEM

(75) Inventors: David Scott Miller, Troy, OH (US); Joe Howard Crew, Springfield, OH (US); Clare Cecelia Dickey, Kettering, OH (US); Lawrence A. Pevoar, Miamisburg, OH (US); Harry Winn Collins, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 64 days.

(21) Appl. No.: 10/091,327

(22) Filed: Mar. 5, 2002

(65) Prior Publication Data

US 2003/0168259 A1 Sep. 11, 2003

(51) Int. Cl.[7] ............................................. G01G 19/40
(52) U.S. Cl. ............................. 177/25.13; 177/25.15; 702/174; 705/414; 700/305; 235/383
(58) Field of Search ........................... 177/25.11–25.19; 702/101, 174; 705/414, 416; 700/305; 235/383

(56) References Cited

U.S. PATENT DOCUMENTS 5,732,212 A * 3/1998 Perholtz et al. ............. 709/224

6,566,613 B1 * 5/2003 Gesuita et al. ............. 177/25.18
6,580,037 B1 * 6/2003 Luke ........................ 177/25.13
6,633,905 B1 * 10/2003 Anderson et al. ........... 709/219

OTHER PUBLICATIONS

"Systems Architecture: Hardware and Software in Business Information Systems", Stephen D. Burd, University of New Mexico., CTI, 1 Main Street, Cambridge MA 02142, pp. 492–522. Copyright 1996.*
Hobart Ameriscale Service Scale and Portion Control Scale, form F–8312 (Rev. 4/01).
Hobart Quantum Service Scale System, form F–7720 (Rev. 11/01).

* cited by examiner

Primary Examiner—Randy W. Gibson
(74) Attorney, Agent, or Firm—Thompson Hine LLP

(57) ABSTRACT

A scale for weighing an item and determining a price for the item includes a weighing station for receiving the item, the weighing station producing at least one weight indicative signal. A scale controller receives the weight indicative signal and determines the price for the item based upon the weight indicative signal. A remote interface link includes associated communication software. A web server associated with the controller serves user interface web page data to the remote interface link for transfer to a remotely located device. Advanced functions such as a monitoring function and service functions may be enabled by remote connection to the scale via the remote interface link.

36 Claims, 14 Drawing Sheets

□ TITLE: Operate: Run mode □□☒

| Start | | Product data | Settings | | Help |

Product number: 451

Super Gold and Crispy (tm) 60 Piece Chicken

By Count: 1    Package sizes    Net weight: ☐ oz

Shelf life: days hours [0] [0]    Product life: days hours [0] [0]

Net Weight 0 lb 0 oz    Total price $ ☐

Run mode: Weigh, wrap and apply label | Total type: Prepack | Operator: Martha Stewart Enter a Product number or select a product using "Find a product" located under the "Help" menu.

| | Start | Done | Product data | Settings | | Help |
|---|---|---|---|---|---|---|

Product number: 451

| | Primary | Second | Third |
|---|---|---|---|
| Label types: | 114 | 0 | 221 |
| Applier rotation: | 45 | 0 | 180 |
| Width (inches) | 2.25 | | 1.50 |
| Length (inches) | 2.375 | | 1.750 |
| Label stock width/length | 2.25/2.375 | | 1.50/1.750 |

| Graphic 1: | 11 | Frequent buyer logo |
| Graphic 2: | 8 | Fireworks |
| Graphic 3: | 19 | Easter bunny |
| Graphic 4: | 57 | Grill | loading images: done

<< >> stop reload  http://dickecc/operate_mainRunMode.asp   mem:4140k/4559k,threads:13

Fig. 19

| System | Product | Totals | Setup | Help |
|--------|---------|--------|-------|------|

Product number: [ 0 ]  [ New ]  [ Renumber ]  [ Delete ]

Description: [ This is the text for the Product description ]

Unit price: $ [ 0 ] /lb   ☐ Forced price

Discount type: [ Cents off ▾ ]   Discount #1: $ [ ]
                                  Discount #2: $ [ ]
                                  Discount #3: $ [ ]

*Fig. 21*

SCALE FOR WEIGHING AND DETERMINING A PRICE OF AN ITEM

TECHNICAL FIELD

This application relates generally to scales used for weighing food product in supermarkets, groceries and other stores, and, more particularly, to a scale including a desirable user interface configuration.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Existing scales may also include a network connection for purposes of updating the scale database and other settings such as label configurations. However, the network connection provided on scales in the past has been limited in functionality, primarily allowing information to be downloaded to and from the scale without providing any real-time, remote interaction with the scale.

Accordingly, it would be desirable to provide a scale with a user interface arrangement that facilitates both resident user operation and remote user operation.

SUMMARY

In one aspect, a scale for weighing an item and determining a price for the item includes a weighing station for receiving the item, the weighing station producing at least one weight indicative signal. A scale controller receives the weight indicative signal and determines the price for the item based upon the weight indicative signal. A remote interface link provides access by external devices. A web server associated with the controller serves user interface web page data to the remote interface link for transfer to an external device.

In another aspect, a scale for weighing an item and determining a price for the item includes a weighing station for receiving the item, the weighing station producing at least one weight indicative signal. A scale controller receives the weight indicative signal and determines the price for the item based upon the weight indicative signal. A resident interface link includes an associated display screen and a remote interface link provides access by external devices. A web server associated with the controller serves user interface web page data to one or both of (1) the resident interface link for display on the display screen and (2) the remote interface link for transfer to an external device.

In a further aspect, a method for assisting a scale operator in troubleshooting a certain scale configured to weigh and determine a price for items is provided where the scale includes a web server and an associated remote interface link connected to a network. The method involves communicating with the scale operator; identifying a network address associated with the certain scale; remotely connecting to the scale using a web browser by pointing to the identified network address; receiving an interactive login web page from the scale; and logging in to the scale via the remote connection.

In yet another aspect, a method for monitoring operations of a certain scale configured to weigh and determine a price for items is provided where the scale includes a web server and an associated remote interface link connected to a network. The method involves identifying a network address associated with the certain scale; remotely connecting to the scale using a web browser by pointing to the identified network address; receiving at least one interactive login web page from the scale; logging in to the scale via the remote connection; and receiving automatically provided web page data via the remote connection, the web page data being updated in real time to reflect on-going operations of the scale.

BRIEF DESCRIPTION OF THE DRAWINGS

FIGS. 8 and 9 are examples of user interface displays;

Figure 19:
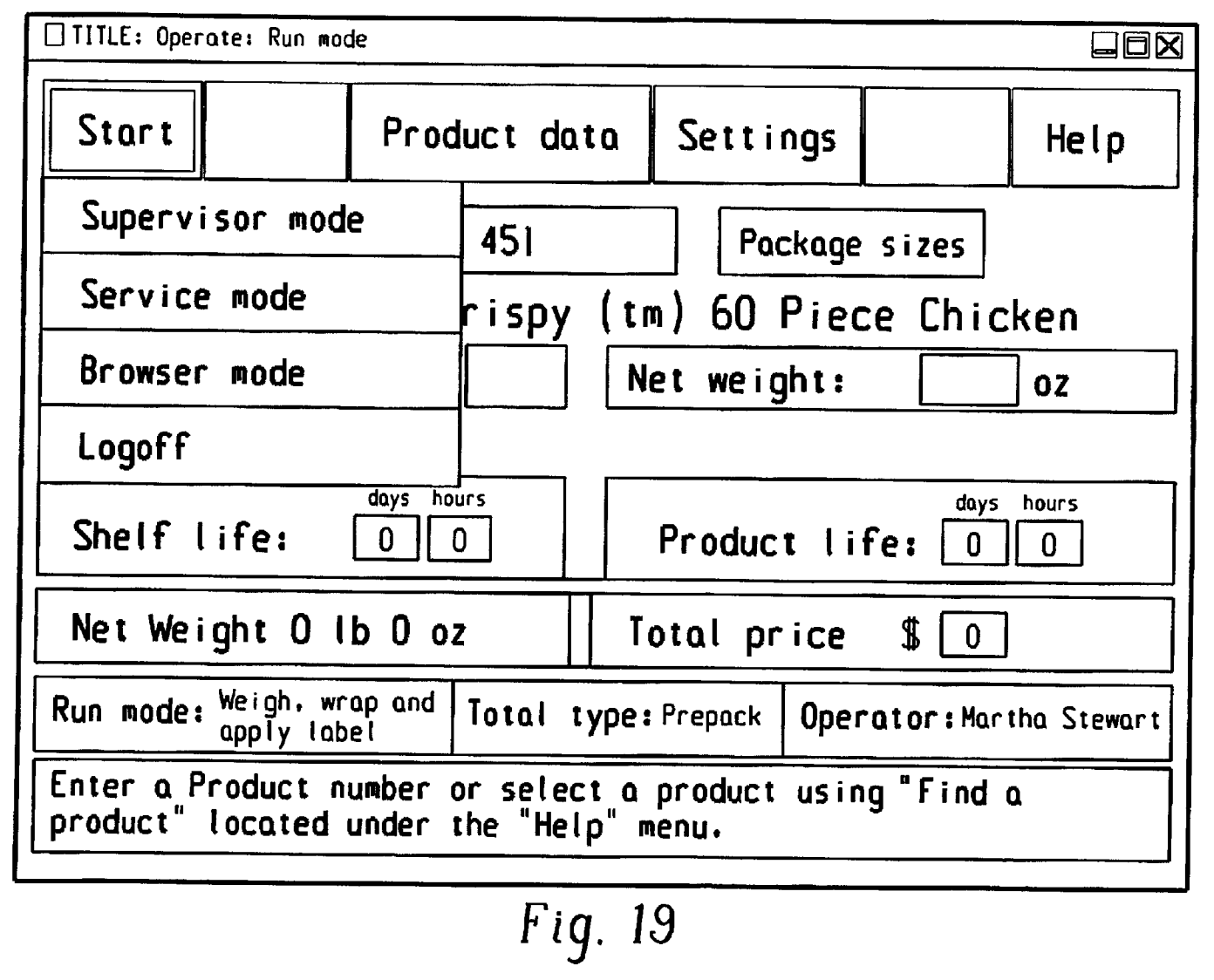

FIGS. 18–21 are examples of user interface displays for a scale supervisor mode;

DESCRIPTION

Figure 1:
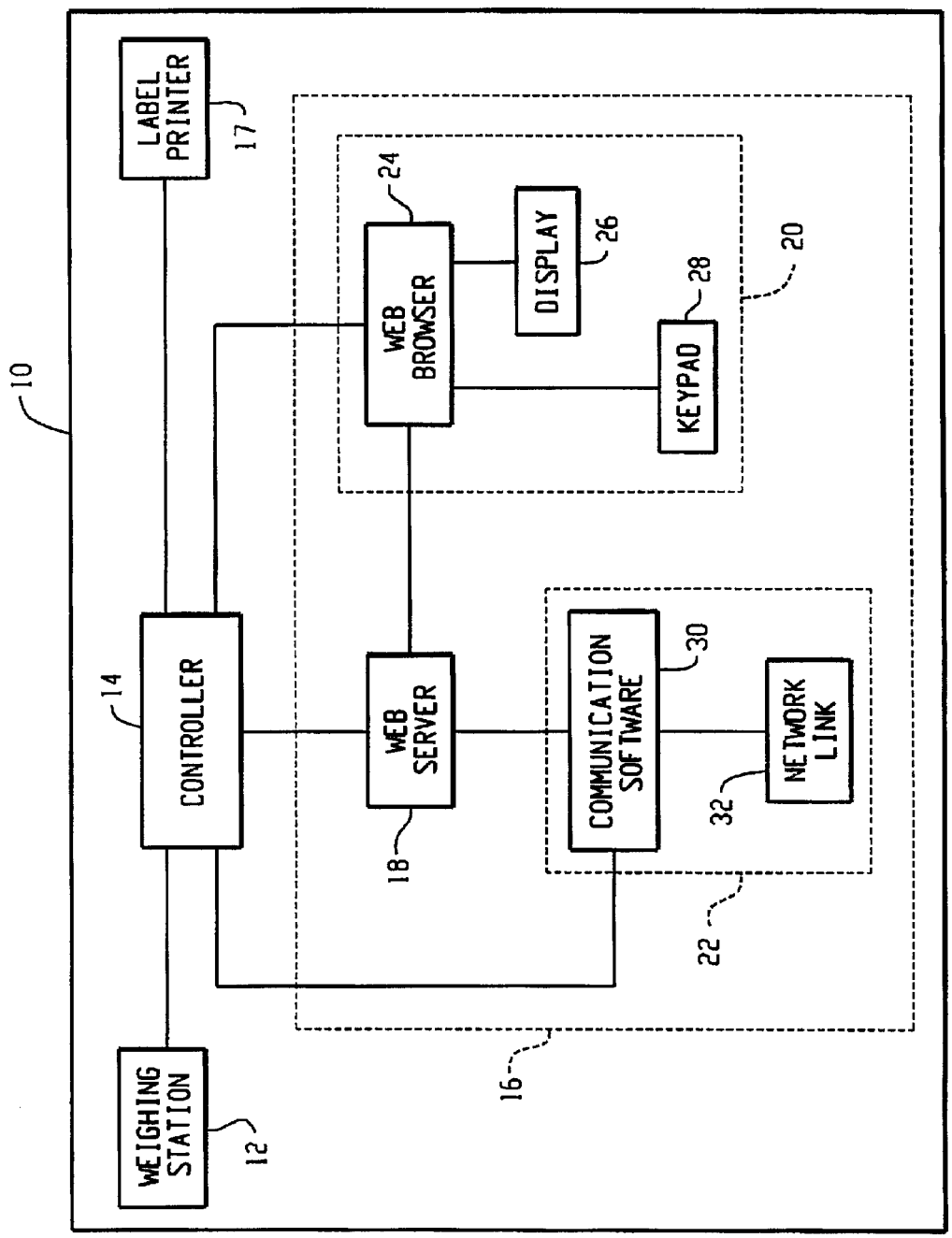
FIG. 1 is a block diagram of one embodiment of a scale.

Referring to FIG. 1, an exemplary scale 10 includes a weighing station 12 and a processor-based controller 14 for controlling scale operations. An exemplary operating system for the controller 14 is VX Works® available from Wind River Systems, Inc. of Alameda, Calif. (www.windriver.com). Standard computer memory is also provided (such as any one or more of RAM, ROM, EEPROM, flash memory or other memory types as may be desired or needed for a given scale). A user interface arrangement 16 associated with the controller 14 includes a web server 18, a resident interface link 20 and a remote interface link 22. The terminology "resident interface link" defines an interface link for an operator located at the location of the scale itself. The terminology "remote interface link" defines an interface link for an operator at a location remote from the location of the scale itself. The scale may also include a label printing mechanism 17 incorporated therein and/or connected thereto as a peripheral device. In operation, an item is placed on the weighing station 12 and the weighing station produces a weight indicative signal that is provided to the controller 14. The controller 14 calculates a price for the weighed item based upon the weight indicative signal and product identifying information. In particular, using a scanned or operator specified PLU number, the controller 14 may look up a price per unit weight of the item and then multiply the price per unit weight by the weight of the item as indicated by the weight indicative signal. When the price is determined, print control data may be established and sent to the printer 17 for printing a label to be applied to the weighed item.

The resident interface link 20 may include web page viewing software 24, a display 26 and a manual user input mechanism 28. In one arrangement the web page viewing software may be any standard web browser software running in connection with the processor of the controller 14. An exemplary web browser suitable for use is the IceStorm web browser also available from Wind River Systems, Inc. The user input mechanism may, in one example, be formed by an arrangement of input keys. In one arrangement the display 26 may be a touch-sensitive LCD for enabling interaction via computer-generated buttons on the display.

The remote interface link 22 may include network communication software 30 and a network link 32. The network communication software 30 may be software running in connection with the processor of the controller 14 and may be a standard gateway interface utilizing TCP/IP protocol, but it is recognized that any other suitable communication protocol could be used. The network link 32 may be formed as a hardware link, such as a standard network connector, or may be formed by a wireless device such as an RF or infrared transceiver.

The web server 18 operates in association with the controller 14 to selectively serve appropriate web page data to one or both of the resident interface link 20 for display on the display 26 and the remote interface link 22 for transfer to a remotely located device (such as another scale or a PC or other computer). Web page data may, for example, be formed by one or more of HTML (HyperText Markup Language), Javascript, ASP (Active Server Pages), and Java Applets (programs for execution by web browsers).

Figure 3:
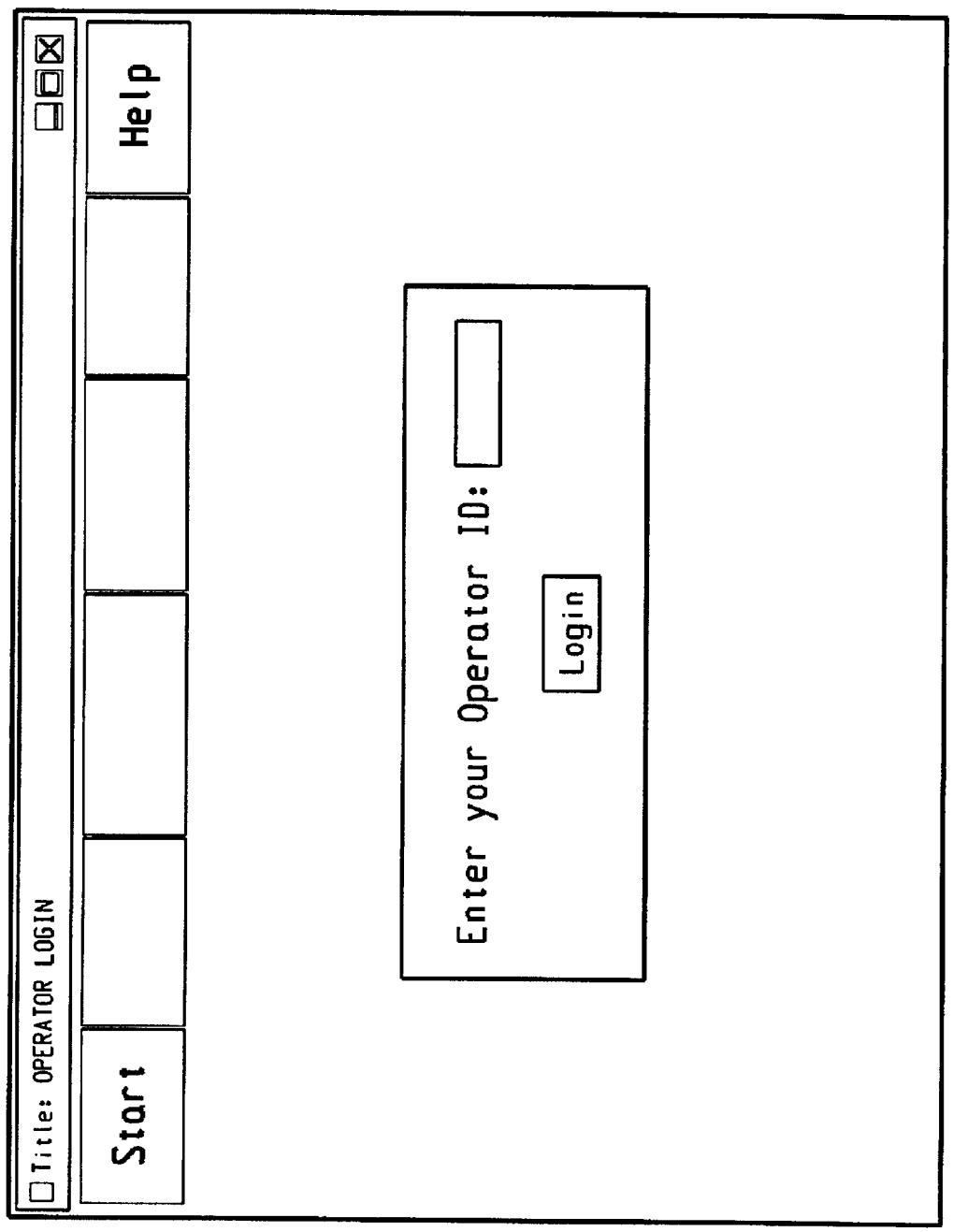
FIG. 3 is an embodiment of a scale user interface login display.

At power up of the scale appropriate web page data may be served to the resident interface link to provide an interactive web page enabling an operator to enter an operator ID, or other login information, to verify that the operator is entitled to use the scale. An exemplary screen/web page is shown in FIG. 3. After a successful login a standardized interactive web page enabling the operator to perform various functions, such as standard weighing functions could be served to the resident interface link 20 for being displayed on display 26. The web server 18 may also serve web page data to the remote interface link 22 for transfer top external devices seeking remote access as will be explained in further detail below. The web server 18 may be any suitable web server software running in connection with the processor of the controller 14. An exemplary web server suitable for use is the GoAhead® web server available from GoAhead Software, Inc. of Bellevue, Wash. (www.goahead.com).

Figure 2:
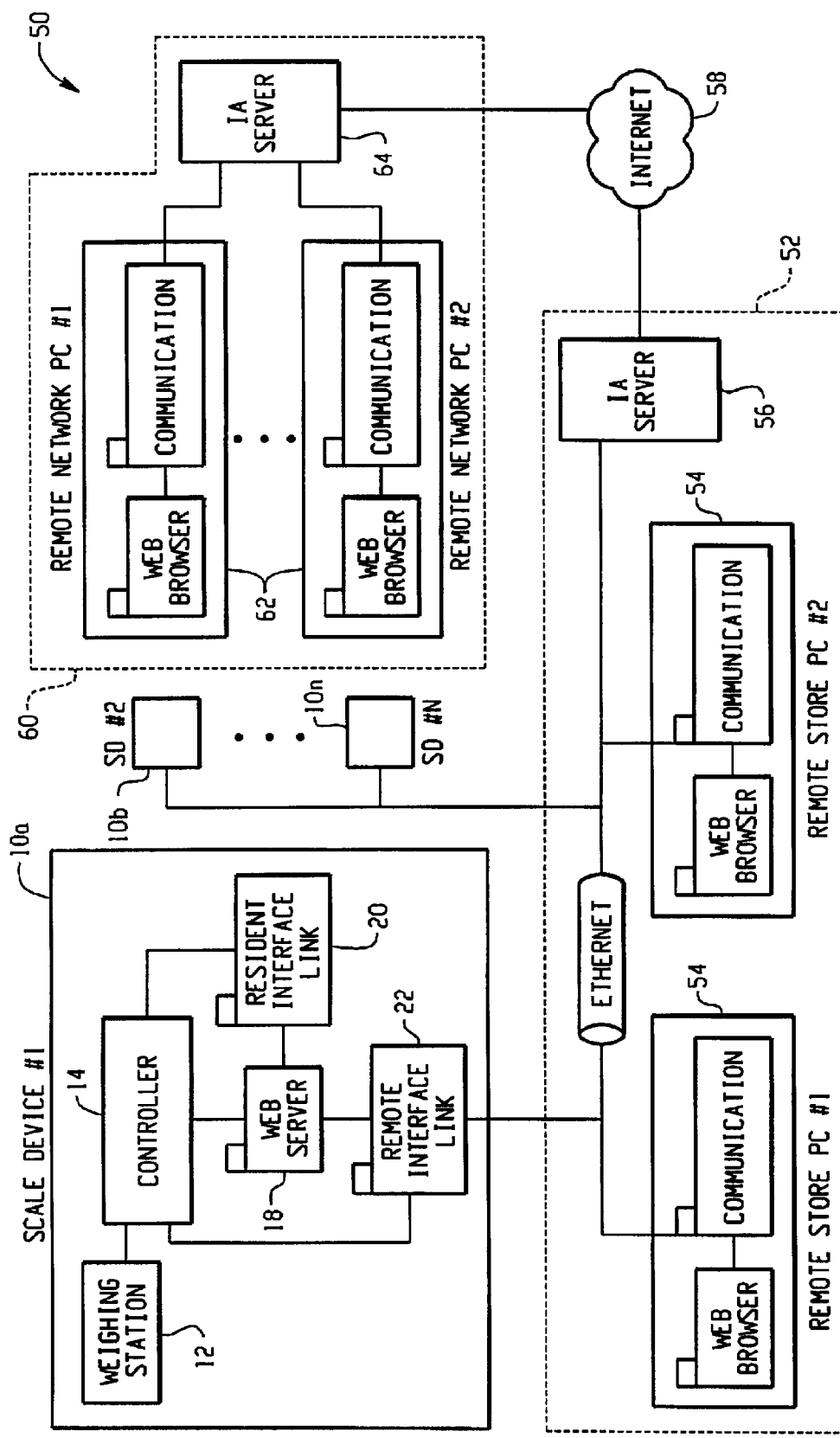
FIG. 2 is a block diagram of a network including one or more scales.

Referring now to FIG. 2, an exemplary system 50 including multiple scales 10a–10n connected via their respective remote interface links to an in-store computer network 52 is shown. The in-store computer network 52 may include one or more PCs or other computers 54 located remotely from the scales 10, as well as an Internet access server 56 connected to the Internet 58. The term PC as used herein is understood to cover computers generally. The Internet access server may include an associated firewall as desired. A remote computer network 60 may include one or more PCs connected to an Internet access server 64.

In the illustrated system an operator at one of the remote store PCs 54 may connect to a given scale as desired by simply entering or selecting a designated URL (universal resource locator) or otherwise specified network address of the given scale 10. The web server responds by forwarding appropriate web page data to the PC 54 via the remote interface link 22. For example, the first web page sent may be an interactive web page for enabling the operator to login to the scale in a similar manner to that described above for the resident interface link. Once logged on, the remote operator could perform various functions such as checking and updating the scale database. Other functionalities may be provided to the remote operator as desired as explained below.

For example, the interactive web page served to a remote operator may enable the operator to select a monitor mode. In the monitor mode, the controller 14 may operate with the web server 18 to serve similar web page data to both the resident interface link 20 and the remote interface link 22 so that the remote operator can view, in real time, the operations of the scale 10 as commanded and controlled by the resident operator. In other words, in the monitor mode the remote operator may see the same information that the resident operator sees and therefore the remote operator is able to track the resident operator's use of the scale. This feature may be useful for monitoring worker productivity or for monitoring improper discounting of product. Thus, a technique for monitoring operations of a certain scale may involve a remote operator identifying a URL associated with the certain scale, remotely connecting to the scale using a web browser by pointing to the identified URL, receiving at least one interactive login web page from the scale, logging into the scale via the remote connection, and receiving automatically provided web page data via the remote connection, the web page data being updated in real time to reflect on-going operations of the scale. In order to prevent the scale from receiving conflicting instructions, certain of the web page data served to the resident interface link may be in an interactive format enabling the resident operator to control the scale, and that same web page data may be served to the remote interface link in view only format.

As another example, the interactive web page served to a remote operator via remote interface link 22 may enable the operator to select a service mode. In the service mode, the controller 14 may operate with the web server 18 to serve web pages enabling more advanced functionality and control of the scale 10, such as correcting an incorrect price in a database, correcting a label type specified, changing or correcting a logo to be printed by the scale on a label or correcting some operational problem that might exist. The service mode may enable a remote operator to check various scale settings as well as various scale sensor readings in attempt to diagnose a problem.

In this regard, a technique for troubleshooting a given scale may involve the resident scale operator calling a remote help desk such as a help desk operator at a PC 54 so that the help desk operator interfaces with the scale operator for voice communication via a telephone connection. The help desk operator identifies a URL associated with the certain scale via a computer look-up or by receiving the information from the scale operator. The help desk operator remotely connects to the scale using a web browser by pointing to the identified URL of the scale, receives an interactive login web page from the scale and logs into the scale via the remote connection. The help desk operator can then check various settings of the scale and/or can attempt to run the scale through the same operation as the resident scale operator to see first hand how the scale is responding.

In one embodiment, the scale 10 may be associated with a store weigh/wrap system and the service functionalities may be expanded to include functionalities relative to the wrapping machine. For example, adjustment of certain wrapper settings could be made via remote connection to the scale.

Other advance functionalities may include enabling a remote operator to login as a supervisor to update database information for the scale, such as by adding new product information.

In the illustrated system 50 a remote operator at one of the remote network PCs 62 may connect to a given scale 10 via the Internet by pointing the web browser 66 of the PC 62 to the assigned URL of the scale 10. Where the in-store computer network 52 includes firewall protection, the operator at the PC 62 may first be required to enter login information to permit access past the firewall and may then be connected to the given scale 10. Use of the above-described monitor mode and service mode at a remote network PC 62 is also enabled.

In connection with the monitor mode and service mode of a subject scale it may be desirable to limit use of those modes to certain persons. Accordingly, the login control of the scale 10 may include various login levels that provide different functions. In one example, an operator logging on to a particular scale may be automatically given access to any and all functions associated with the operator's login information. In another example, an operator desiring to login for monitor mode functions or service mode functions may be required to specifically select an advanced login mode when presented with the interactive login web page, such as by using a pull/click down menu of the interactive login web page.

Where the resident interface link 20 includes a web browser, the browser might be used by the resident scale operator to connect to other devices. For example, an operator at a particular scale may elect to login to the scale in a "browser mode." The browser mode login may be selected at the time of login, or access to the browser mode functionality may be provided automatically to the user at the time of login, if the user is so entitled based upon entered login information. In the browser mode the resident operator of the scale may direct the web browser to access externally generated web page data via entry of a desired URL. Where the keypad 28 available to the operator does not include a full range of alphabetic functionalities, pull/click down menus with previously stored URLs may be used. Such pull/click down URL menus may also be used to "limit" the browsing performed by the resident operator. In such cases different operators may be permitted different URL options according to their login data. The web browser of a given scale 10 may, for example, be used for accessing other scales 10 in the same store.

More detailed explanations of certain operations of an exemplary scale 10 and associated system are now provided. These explanations are provided as exemplary only, with the understanding that numerous variations are possible. In the description below, the term "console" is used to describe an interface device and it is assumed that a console can be any one of a primary console (i.e. the display associated with the resident interface link), a secondary console (i.e. a user interface associated with a secondary piece of equipment such as a wrapping machine to which the scale is typically attached via a separate link or with which the scale is integrated) or a remote PC or other computer (connecting through the remote interface link). It is assumed that each console has an associated web browser.

Initial Start-Up of Console

Figure 4:
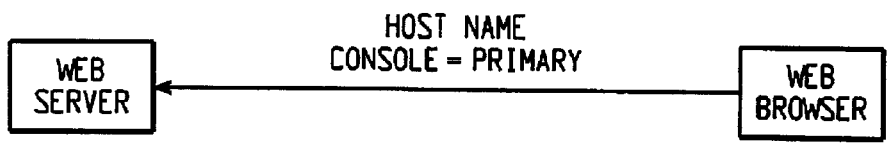
FIGS. 4–7 are exemplary diagrams of scale control system function.

When a console is powered up, it's browser will make a request to the web server for the starting page. In the case of a primary console, the resident web browser 24 is previously configured to automatically request a certain page from the web server of its scale. In the case of a secondary console of, for example, a wrapping machine, the web browser is automatically configured to point to the hostname assigned to the web server of the scale connected to the wrapping machine. If the console is a primary console it will be automatically started from the command line with parameters that will set a named pair to indicate that it is the primary console. If the console is a secondary console it will be started from the command line with parameters that will set the named pair to indicate that it is the secondary console. If the console is a remote PC, when the user points the browser to the scale (via the host name) it will not have any named pair variables set. The web server 18 of the scale will thus be able to identify whether the console is a primary, a secondary or remote console by using this method of identification. An exemplary request from a primary console is depicted in FIG. 4.

Figure 5:
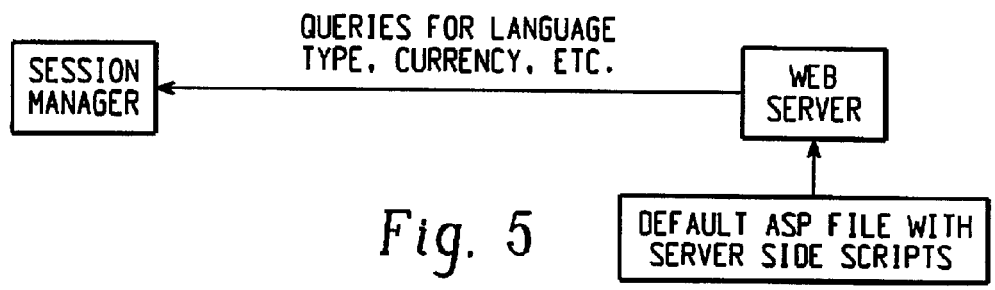

Referring to FIG. 5, when the web server 18 gets the request for the first page, it will select a default ASP file and start to process any server side scripts that it has. A session is also initiated. Server side scripts may be responsible for querying the session for language, currency, and unit of measure settings, querying the session manager for well-known port used by the applet for communicating to the session, querying the session what peripherals are attached to the system (e.g. wrapper (to set what modes the operator may select), USB keyboard (to determine if the on screen keyboard needs to be displayed)), querying the session if operator login is turned on (to determine whether or not to display the login page), querying the session if there is an operator note and if the current operator has yet seen the note (to determine whether or not to display the operator note screen), querying the session for the current operator's access (to determine what options to make available to the operator), notifying the session of what pages the primary console is requesting, along with what parameters were passed to it (to keep monitoring systems synchronized), querying the session for the number of digits set for auto-lookup of products, querying the session for the setting for change forced tare only once, querying the session for the setting for change zero tare only once, querying the session for if manual change of UPC digit is set for the selected total type (to build the page to allow changes to the UPC digit), querying the session if allow product back dating is turned on or off (to build scripts to validate this), querying the session for what format the date and time should be displayed in, querying the session for what the maximum allowable tare value is set to, querying the session for what are the fixed weight units configured for (whole ounces vs. 10ths of ounces), querying the session for if in metric, the 100 gram vs. kilogram setting, querying the session for record data that needs to be filled in on the currently requested page, making calls to retrieve internationalized UI labels, making calls to retrieve internationalized units of measure (weight, length, temperature) and currency, building the screens with the proper colors based on whether the system is a local or remote system, building the screens with proper HTML and Javascript based on whether or not the system is using the IceStorm browser vs. Internet Explorer, building the screens so that they can expand properly on a PC (remote console). Queries to the session may be done through the VXWorks symlib functionality.

The first page sent to the web browser may contain 2 frames. One frame (the Display frame) may contain the HTML and Javascript that will be used to display the page to the user. The other frame may contain the Java applet (the applet frame) that will connect to the server (for real time and asynchronous data) The mechanism of having 2 frames that are always present may be done so that the applet may be associated with one of the frames and will always be up and running. If this were not done then each time a new page was loaded the applet would be stopped and restarted.

When the first page is built the console type will be set in the DOM (Document Object Model), which came back from the initial browser request, and the appropriate well known port (as assigned by the IANA—Internet Assigned Numbers Authority) will be set (from the web server's query to the session manager).

Figure 6:

Once the server has executed it's server side scripts and built the HTML page (possibly containing Javascript as well), it will send it to the browser as indicated in FIG. 6.

Figure 7:
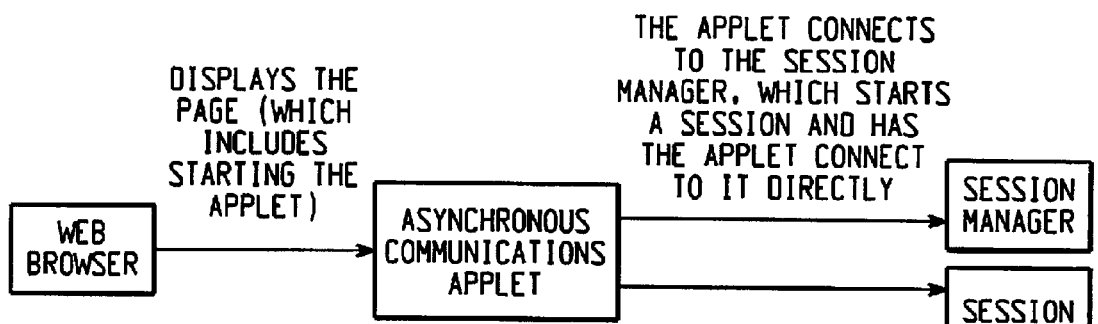

Once the browser gets the page it will display it on its associated display screen. Javascript starts the applet, which will then read the DOM variables for the console type and the well-known port. As reflected in FIG. 7, the applet will then establish a socket connection with the session manager (this will trigger the session manager to create a session and establish the connection between the applet and the newly created session. Also, a session ID will automatically be generated). The applet will set the value of the session ID in the DOM so that all future posts from the browser will now contain the console type and the session ID.

The applet may be responsible for establishing and maintaining a connection to the session, displaying errors that may occur during the connection process, setting the session ID in the DOM so that the browser pages have access to it, reporting updates of field values to the session, processing unsolicited data and, based on the type of data, either updating the DOM, triggering a query for a new page or displaying/removing error messages, notifying its session when a remote browser goes into/out of monitor mode, displaying errors when records are not found in the database, sending requested pages (the entire string that is passed to the web server) to the session—this will be used by the session to keep a monitoring session in synch with the primary console, and triggering queries for pages to synchronize monitoring sessions.

Changing Data on the User Interface

Whenever a change is made to the current state of the data by the operator, the session associated with that operator needs to be updated with the change. All of these changes may be handled via the applet connection. Some will require no changes to the display (e.g. change a by count value, change a label rotation value, etc.). Some will require that the display be updated with new fields (e.g. selecting a new product number that is of a different type than the current product number). A description of how these will work follows.

Figure 10:
FIGS. 10, 11, 12, 13A–13D, 14, 15, 16A, 16B, 17A, and 17B are exemplary diagrams of scale control system function.
Figure 11:
Figure 12:
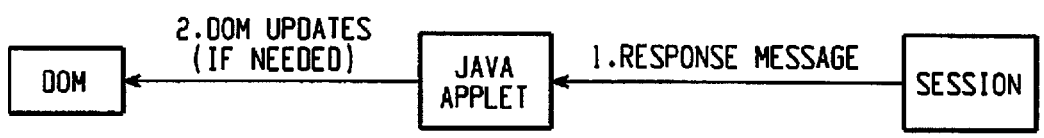
Figure 13A:
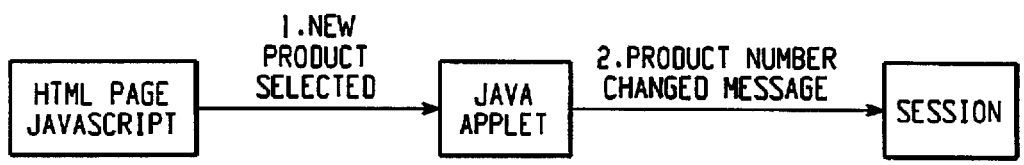
Figure 13B:
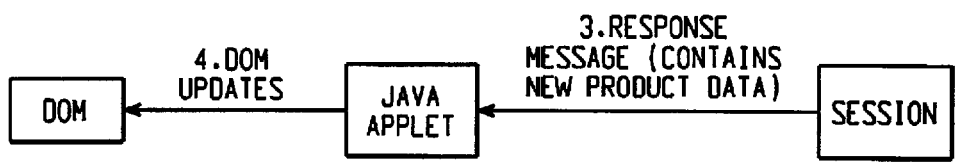
Figure 13C:
Figure 13D:
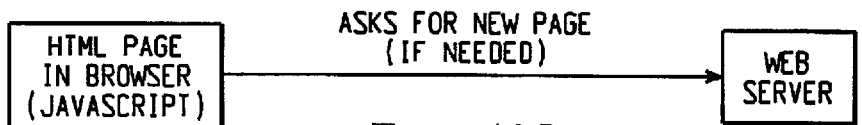

Changes that do not Require a Screen Change:

These types of changes may be handled via the applet connection. An example of this would be an operator changing the by count value of a by count product (see interface screen of FIG. 8), or an operator selecting a new label rotation value (see interface screen of FIG. 9). First the operator makes a change to the by count value and either presses enter or navigates away from the field. This action triggers Javascript in the HTML page to call a method in the applet that tells it the by count value has changed as per FIG. 10. The applet then uses it's socket connection to send a message to the session to tell it that the by count value has changed as per FIG. 11. As shown in FIG. 12, the session may respond with a response message that may or may not contain data that needs to be updated on the display. In the by count case there would not be anything in the response message that needs to be updated on the display. In the case of the operator selecting a new label type, there are some associated fields that would be updated as well (label width, label length, label stock length). These fields would be returned in the response message and the applet would then update the DOM with the new values. In the case of a 'record not available error' (e.g. the label type entered does not exist in the database), the applet will read the error from the response message and be responsible for displaying a dialog telling the operator of the error.

Changes that do Require a Screen Change:

This method may be used when the user selects a new product. It will behave the same way as the method described above (Changes that do not require a screen change) with the exception that Javascript within the HTML page will need to be called by the applet to determine if the product type changed and new fields need to be added to the screen. If the Javascript determines that the product is a different type than the currently selected product (requiring new fields to appear on the page), then it will need to ask the web server for the appropriate page, as reflected in the sequence of FIGS. 13A–13D.

Figure 14:
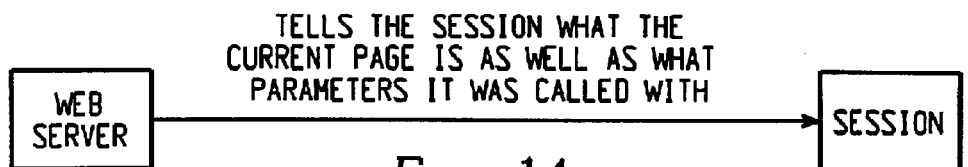
Figure 15:
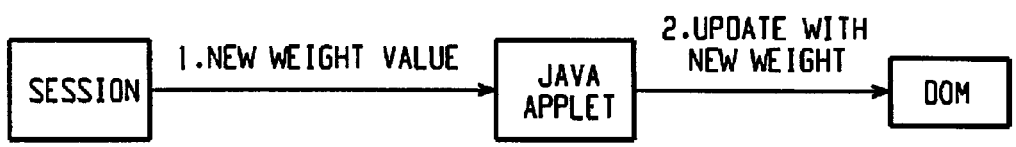

Updates of Real Time Data:

There is some data that will need to be continuously updated to the interface in a real time fashion (e.g. current scale weight, current sensor values, current temperature, etc.). These updates will be handled via registration for these specific types of real time events (e.g. when on the run screen the system would want to get system errors and weights, when on the wrapper settings page the system would want to get temperature values). The mechanism for registering these events will be through the session. Per FIG. 14, the session knows what page the browser is on, so based on this knowledge, it will know what messages the browser needs to get and will register with the real time control to get them. The session then determines that it needs to register for real time messages (e.g. weights in this example) and registers with the real time control. As shown in FIG. 15, messages for weights come into the session, and are sent to the applet. As the applet receives them it updates the DOM with the new values. This update will trigger the browser to automatically update the web page data with the new values. Once the session has registered for a certain set of real time messages, it will continue to pass those messages until it deregisters for them. To deregister (e.g. operator goes to another screen that does not need to have the weight on it), the session will deregister with the real time control.

Figure 16A:
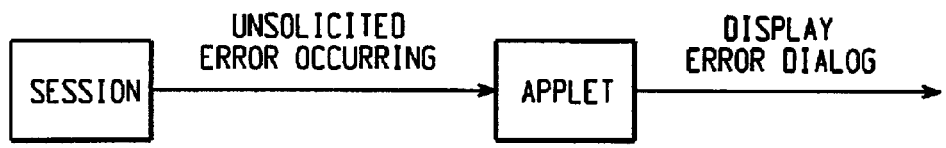
Figure 16B:
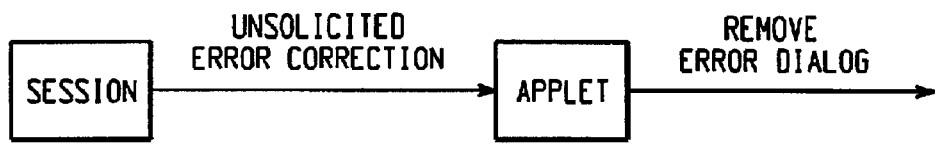

Error Messages that Appear and are Removed in an Unsolicited Manner:

Errors may come through to the applet in the same way that is described for the real time data (e.g. they will be sent from the session to the applet as they occur). The applet will track what errors are occurring and, as they occur, it will bring up appropriate dialogs to warn the operator about the problem. If the error is resolved while the dialog is up (e.g. the operator closes the printhead while a printhead up dialog is on the display), then the dialog will automatically be removed. If the operator chooses to ignore the warning the session will track that the error condition still exists. Prior to printing, if the error condition still exists, the operator will be notified via the dialog of the condition per FIG. 16A. If a message comes notifying the applet that the error condition has been corrected, then the applet will remove the error condition from it's list of outstanding errors and also remove the error dialog per FIG. 16B.

Field Masking and Validation:

Field masking and validation may be done using client side javascipt. Rules for masking will vary based on country (i.e. currency differences). These differences may be handled via server side functions that change the javascript based on the language, currency and unit settings. Masking and validation will be responsible for ensuring that the maximum number of characters is not exceeded, ensuring formatting data appears in the field as the operator enters data (decimal placement is correct), ensuring only the correct type of characters may be entered in a field (e.g. numbers only, no alpha, in some cases no decimals), ensuring min/max values are not exceeded (calls Java code to display a dialog for the operator), verifying the number of digits entered (for auto-lookup) and forcing the auto-lookup, ensuring that values are entered when required, ensuring that the operator cannot change a value more than the allowed number of times (e.g. change forced tare only once), and date and time formatting.

Operator Access to Fields:

In order to prevent the operator from having functionality that they are not permitted, a server side ASP function can query the session for the operator's access. Each ASP page that contains fields that an operator may not have access to may also contain server side scripts that will make the fields that the operator may not change view only. The operator accessibility will be made available by making a script call that, for example, makes available variables that contain the operators access level 1–9, indicates if the operator has access to change the date and time (True/False), indicates if the operator has access to change the unit price (True/False), indicates if the operator has access to change the by count (True/False), indicates if the operator has access to change the tare (True/False), indicates if the operator has access to change the shelf life (True/False), indicates if the operator has access to change the label type (True/False), indicates if the operator has access to change the net weight (True/False), and indicates if the operator has access to change the product life (True/False).

Attempts to Select Records that are not in the Database:

If the operator attempts to select a record that is not in the database an error will come back in the response message from the session. The applet will then be responsible for generating a dialog box (via java) to tell the operator that the record does not exist in the database.

Figure 17A:
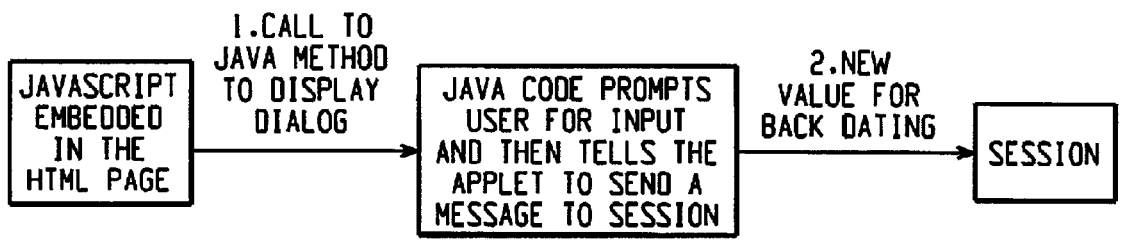
Figure 17B:
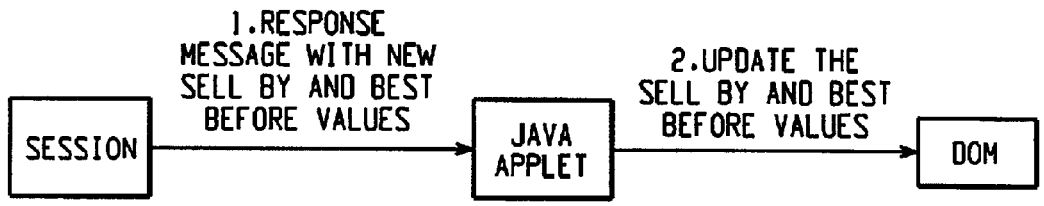

Immediate Requests for Data:

There will be some cases where there will be prompts that appear on the user interface display that query the operator for some information. Because of the limited functionality of HTML and Javascript these queries may be handled via Java code called from the Javascript. For instance, if a product backdating feature is turned on for a specific product type, then when the operator selects a product, a dialog will appear that will prompt the operator for the number of days to backdate. The applet will then update the session with the new value as per FIG. 17A. The session will then send changes to associated data in the response message (e.g. new sell by and best before dates), and the applet will then update the DOM with the new values per FIG. 17B.

Entering Monitor Mode from a Remote Console:

When an operator enters monitor mode from a remote PC, the applet notifies the session that the operator has gone into monitor mode. The session will then link up with the primary console's session and send page requests (along with parameters) back to the remote applet. The applet will then call Javascript on the HTML page to request the web server for the monitored page. Monitored pages sent from the web server to the remote PC may be the same as the actual pages with the exception that all fields on the monitored pages may be view only. The only exception to this is Start menu. The Start menu may have accessible one option in it (leave monitor mode). Making this selection will cause the applet to tell the session that it is leaving monitor mode. The browser will then request the $1^{st}$ remote page from the web server. For the purpose of this application, the forwarding of web page data that is not view only to the primary console (resident interface link) and the forwarding of the same web page data in view only form to the remote console (via the remote interface link) is sufficient to be considered the serving of similar web page data to both the resident interface link and remote interface link in the monitor mode. While in monitor mode the remote PC will be able to track the local console (resident interface link) through various operations.

Supervisor Mode User Interface

Figure 20:
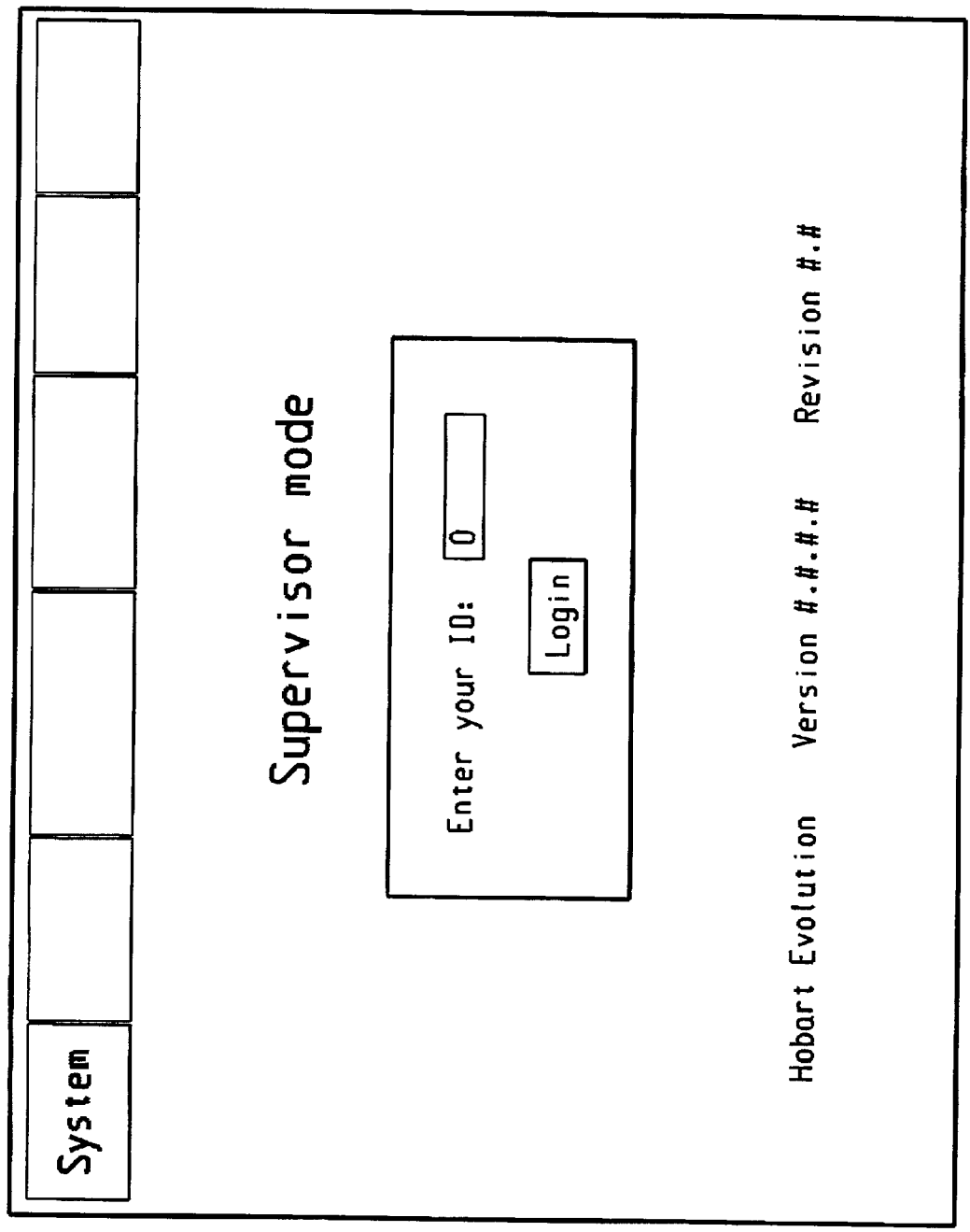

The supervisor mode is considered an advanced mode providing additional functionalities over those provided in the operator mode. Supervisor mode menu options of an exemplary embodiment may be as follows:

1. System
   a. Operator Mode
   b. Service Mode
2. Change Product
   a. Product changes
      i. Unit price
      ii. Tare
      iii. Shelf life
      iv. Class
      v. All price fields
      vi. All fields
   b. Class changes
   c. Set default product values
3. Totals
   a. Hourly Totals
   b. Operator Totals
   c. Product Totals
   d. Class Totals
   e. Void totals
   f. Totals types
4. Setup
   a. Backup/Restore
   b. Operators
      i. Operators
      ii. Operator changes
      iii. Operator notes
      iv. Set what the operator can modify
   c. Store Information
   d. Communications
      i. TCP/IP network
      ii. DNS support
      iii. Server scale IP address
      iv. External communications
      v. Ping an IP address
      vi. Network report
      vii. Link Quality
      viii. Network Card
   e. Labels
      i. Select special fields to print on a label
      ii. Label text names
      iii. Label types
      iv. Graphics
   f. Scale operations
      i. Date/Time
      ii. Normal scale operation
      iii. Statistics iv. Server departments
v. Delete all files
vi. Reboot the scale
5. Help
a. Help questions This menu of options could be made available (e.g. in pull down format—see FIG. 18) to a user when the user enters the supervisor mode, after login as an operator, via use of a specialized supervisor mode login screen. For example, initial login may provide a start menu option enabling access to advanced modes, including supervisor mode, service mode and browser mode as shown in FIG. 19. Selecting one of these advanced modes could cause an advanced login screen (FIG. 20). Alternatively, certain operators may be entitled to access the supervisor mode menu via an appropriate selection, provided the login information they originally provided entitles them to access the supervisor mode. While the entire supervisor mode menu may be displayable for all persons entitled to access the supervisor mode, various of the functions may be enabled according to a number of different access levels, meaning that certain of the menu functions might not be enabled for certain "supervisors." Non-enabled menu functions they could be displayed in view only format. For example, nine access levels could be provide for users logging into the scale, with level 1 access being standard operator mode access and with levels 2-9 providing various controlled levels of access to the various supervisor functions, or functions of other advanced modes.

System Menu Option:

As shown in supervisor menu option "System," the supervisor can choose to return to the operator mode per a. or to move to the service mode per b.

Figure 18:
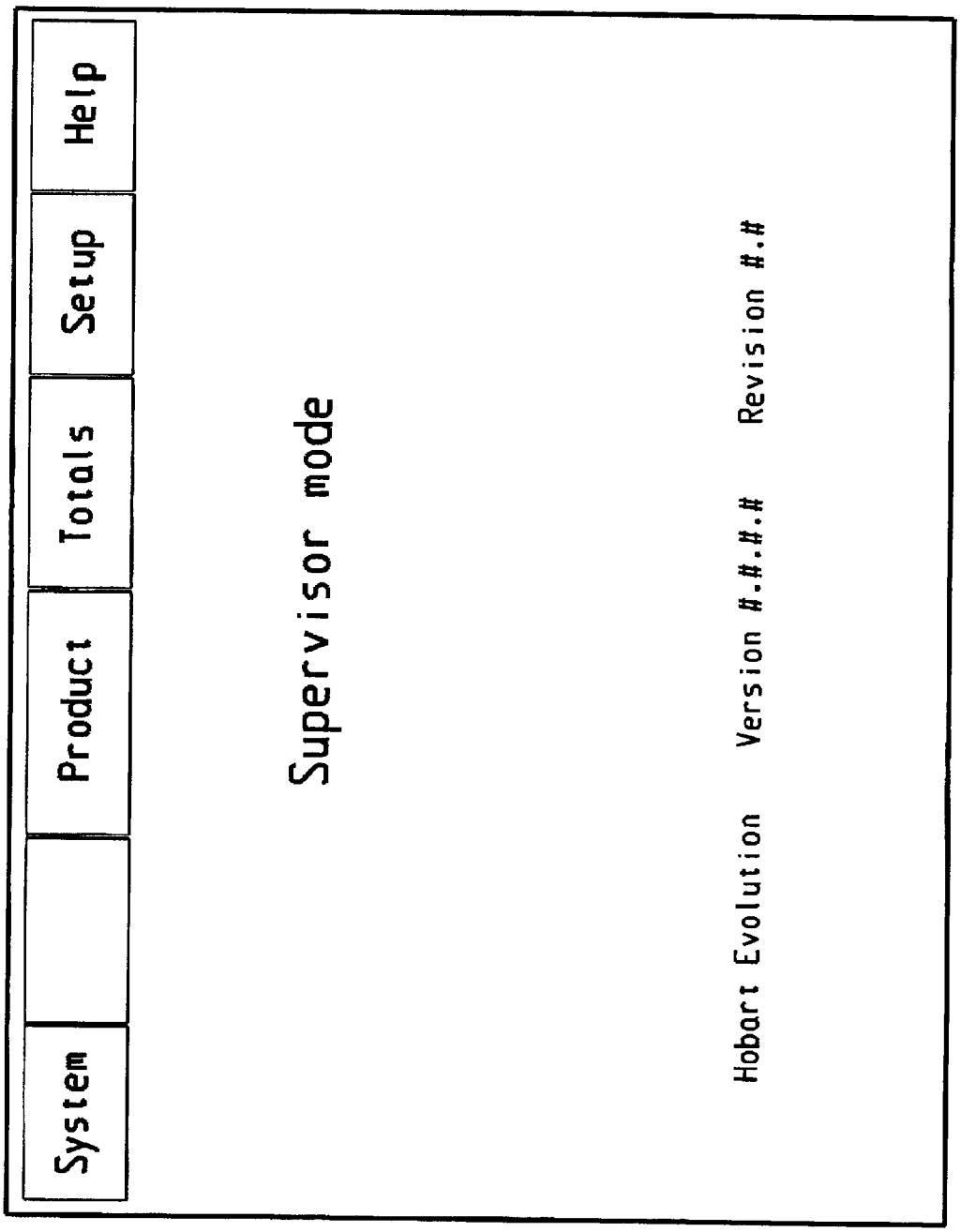

Change Product Menu Option:

Using the supervisor menu option "Change Product" (or "Product" as shown in FIG. 18) the operator can select the "Class changes" screen/page. The standard menu for the Class changes screen may include a numeric field for the class number (1-999999), a button to add a new class record, a numeric field for the reporting class (0-999999), a text area for the class description (80 characters max.), a scrollable area with a tree control of all classes (fields in the list may include class number (with expand (+) and contract (−) symbols next to it as appropriate) and a class description), an internationalized keyboard (if there is not a USB keyboard attached and this is not a remote session), a delete the selected class button, a link products to this class button. The data area of the screen will be populated with the data from the first class in the list. As the operator navigates through the tree of classes the data area will be populated (in real time) with the values of the currently selected class.

Once in the Class changes screen, the operator may, for example, create a new class, delete a class, edit an existing class, print classes or associate multiple products with one class record.

To create a new class the operator enters a class that does not exist in the database or presses the new button and then leaves the class number field. The system displays a dialog that tells the operator that the selected class does not exist and asks if they want to create it (OK/Cancel) or asks them to enter the class number that they want to add (if they pressed the new button). The operator presses the OK button and the dialog box closes and the system creates the class with a blank description and a reporting class of whatever the currently selected class is and then the cursor is moved into the class description field. Also the newly created class appears in the tree list of classes. The operator may then change the reporting class or the class description. The tree list is updated to reflect the changes made. Once the operator leaves the screen or selects another class, if intranet or server application support is enabled, then the addition may be automatically sent out via the scale communications mechanism over the remote interface link to, for example, other scales or a store database.

To delete an existing class, the operator selects the class number that they want to delete, by either typing it in, scrolling to it in the tree list or touching it in the list. Once the desired class is selected the operator presses the delete class button. Once the operator leaves the screen or selects another class, if intranet or server application support is enabled, then the addition/change may be sent out via the scale communications mechanism.

To edit an existing class, the operator selects the class number that they want to edit, by either typing it in, scrolling to it in the tree list or touching it in the list. The operator may then change the reporting class or the description for all but the reserved classes. The tree list is updated to reflect the changes made when they leave the record. Once the operator leaves the screen or selects another class, if intranet or server application support is enabled, then the addition/change may be sent out via the scale communications mechanism.

From the Change product menu screen/page the operator may also select the Product changes screen. The Product changes screen allows the operator to select the Unit price screen, the Tare screen, the Shelf life screen, the All price fields screen or the All fields screen, with each of these screens specifying certain fields that the operator can work with. One of the screens, such as the Unit price screen, may be used to set default fields displayed when the operator selects the Product changes screen. An exemplary Product changes screen/page is shown in FIG. 21.

Creating a New Product and Editing its Data:

To create a new product, the operator enters a product number that does not exist in the database or presses the new button. If the operator enters a non-existing product number, a dialog will come up asking the operator if they want to create a new product (along with the type selection (Random Weight, By Count, Fixed Weight, Fluid Ounce) set to the current default value), create a new product based on an existing one (Along with a field to enter the product number the operator would like to copy), change the existing product number (if there was a product selected before the new value was entered), or cancel. If the operator presses the new button, the dialog will request entry of the product number and type to be added, the operator selects the type of product that they want to create and then presses the create new product button, and the system creates a new product and populates its values with the default values of the type that was selected. The operator may then modify the product as desired. Once the operator leaves the immediate changes screen or selects another product, if intranet or server application support is enabled, then the addition/change will be sent out via the scale communications mechanism.

Changing an Existing Product's Number:

From the Product changes screen, the operator enters the number of an existing product. The operator then enters a product number that does not exist in the database. A dialog will come up asking the operator if they want to: create a new product (along with the type selection (Random Weight, By Count, Fixed Weight, Fluid Ounce)), create a new product based on an existing one (Along with a field to enter the product number the operator would like to copy), change the existing product number (if there was a product selected before the new value was entered), or cancel. The operator selects change the existing product number. The system then changes the product's product number to the new value and returns to the product screen. If intranet or server application support is enabled, then the system will send a delete and then an add of the modified product record (to other scales and/or a remote database) once the record is left. The operator may then modify the product as desired.

Deleting an Existing Product:

From the Product changes screen, the operator is on the product changes screen, the operator enters the number of the product that they would like to delete. If the checksum does not match then the system will put up a dialog warning the operator that the data may be suspect. The system will also make sure that all data is within valid ranges and then it will be displayed on the screen. The operator then presses the delete button. The system deletes the current product and returns to the immediate changes screen with no product selected. If intranet or server application support are enabled then the deleted record is sent out to other scales and/or a remote database.

Viewing Hourly Totals:

The scale may include software for tracking information regarding items weighed and labeled. A supervisor may be provided access to such information as follows. From the supervisor menu screen the operator selects hourly totals from the Totals menu choice. A screen is displayed with the following elements on it: the standard menu; a scrollable table with hour (0-23 starting at 0), packages (0-4294967295), runs (0-4294967295), weight (0-4294967295 (decimal places dependent upon weight units)), dollars (0-4294967295 (decimal places dependent upon currency)), items (0-4294967295); a button to clear all hourly totals; a button to clear all scale totals. The operator may then use the scroll buttons to view the various hours' totals.

Viewing Operator Totals:

Similarly, the scale may include software for tracking information by specific operators. A supervisor may be provided access to the information as follows. From the supervisor menu screen the operator selects operator totals from the totals menu choice. The system displays a screen with the following elements on it: the standard menu; a scrollable table with operator name (the first 13 letters), packages (0-4294967295), runs (0-4294967295), weight (0-4294967295 (decimal places dependent upon weight units)), dollars (0-4294967295 (decimal places dependent upon currency)), items (0-4294967295); a button to clear all operator totals; and button to clear all scale totals. The operator may then use the scroll buttons to view the various operators' totals.

As suggested by the above standard menu, similar screens can be provided for viewing class totals, for allowing a supervisor to void totals and for allowing a supervisor to set-up new total types for tracking or to edit existing total types.

Backup and Restore Functions:

As reflected by the standard menu shown above, backup and restore functions may also be provided for supervisors via the Setup menu selection. Thus, interface screens can be provided to allow users at a remote PCs to backup the scaled device database to a CD or other storage medium, or to upload a database from a CD ROM or other storage medium to the scale. Similarly, functional interface screens can be provided to allow a user at one scale to forward that scale's database to other scales in the same store.

Operator Control Functions:

By selecting the Operators menu selection a supervisor may be provided access to interface screens to permit functions such as viewing the list of operators and their associated IDs, editing operator information, adding or deleting operators, and controlling what functions are accessible to each operator.

Communications:

By selecting the Communications menu selection a supervisor may be provided access to interface screens to enable functions such as setting up DNS support, setting up bootup support, setting the scale server IP address, changing external communications settings, pinging an IP address, network reporting functions etc.

Labels and Scale Operations:

Selecting the Labels menu selection may enable a supervisor to perform various label editing, adding and deleting functions. Selecting the Scale Operations menus selection may enable a supervisor to change the time, date and format on the scale; change normal scale operations, view scale statistics such as amount of used flash memory, amount of free flash memory, amount of used RAM memory, amount of free RAM memory, number of products in the database, number of classes in the database, number of expanded text in the database, number of special messages in the database, number of product notes in the database, number of label types in the database, number of graphics in the database, number of operator ID's in the database, and number of products that may be added to the system; view server departments; delete files; and reboot the scale.

Of course, the above functions are merely representative, and many additional functions could be provided via the user interface arrangement provided.

Figure 22:
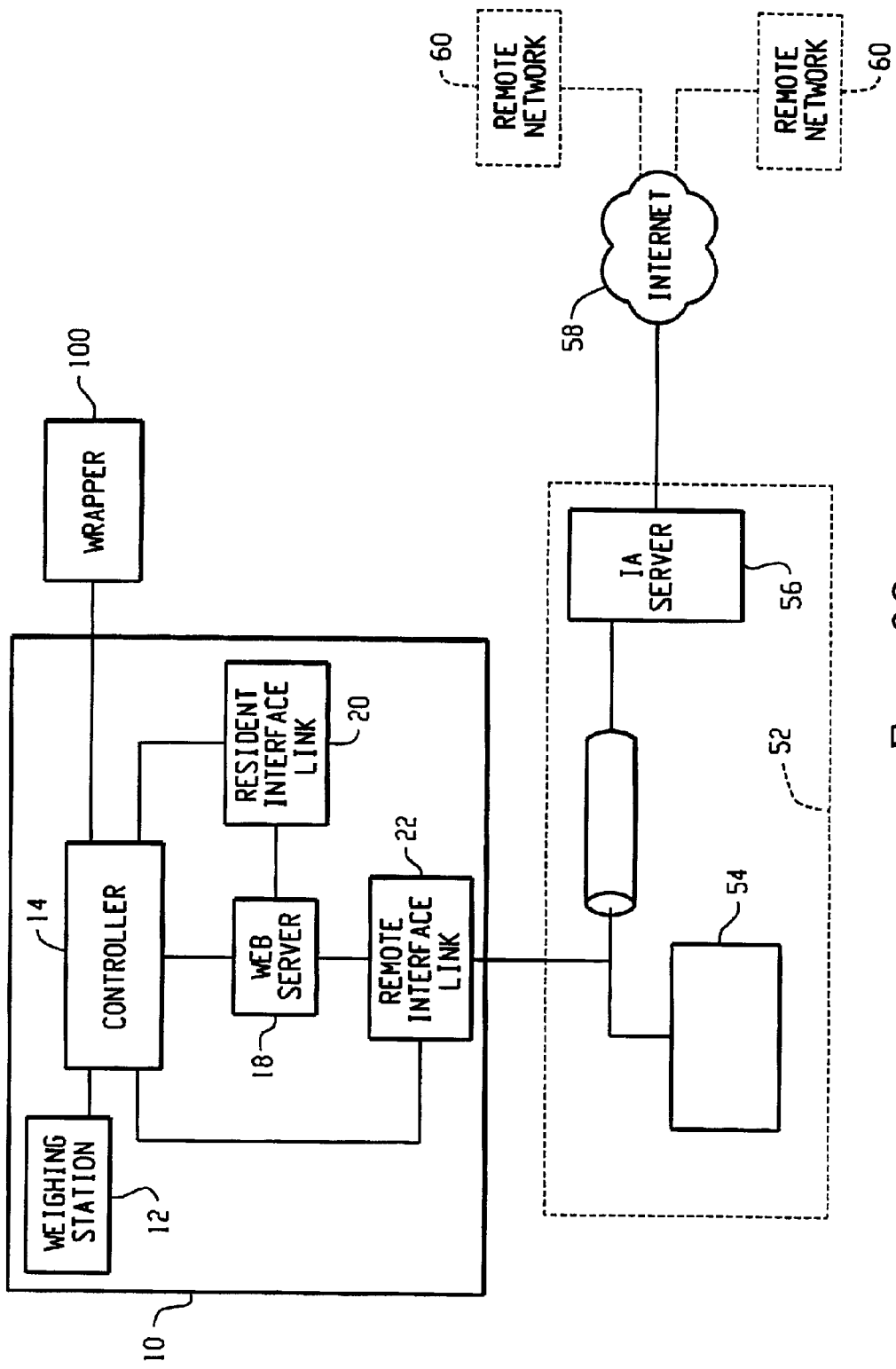
FIG. 22 is a block diagram of networked scale that is also associated with a wrapping machine.
Figure 23:
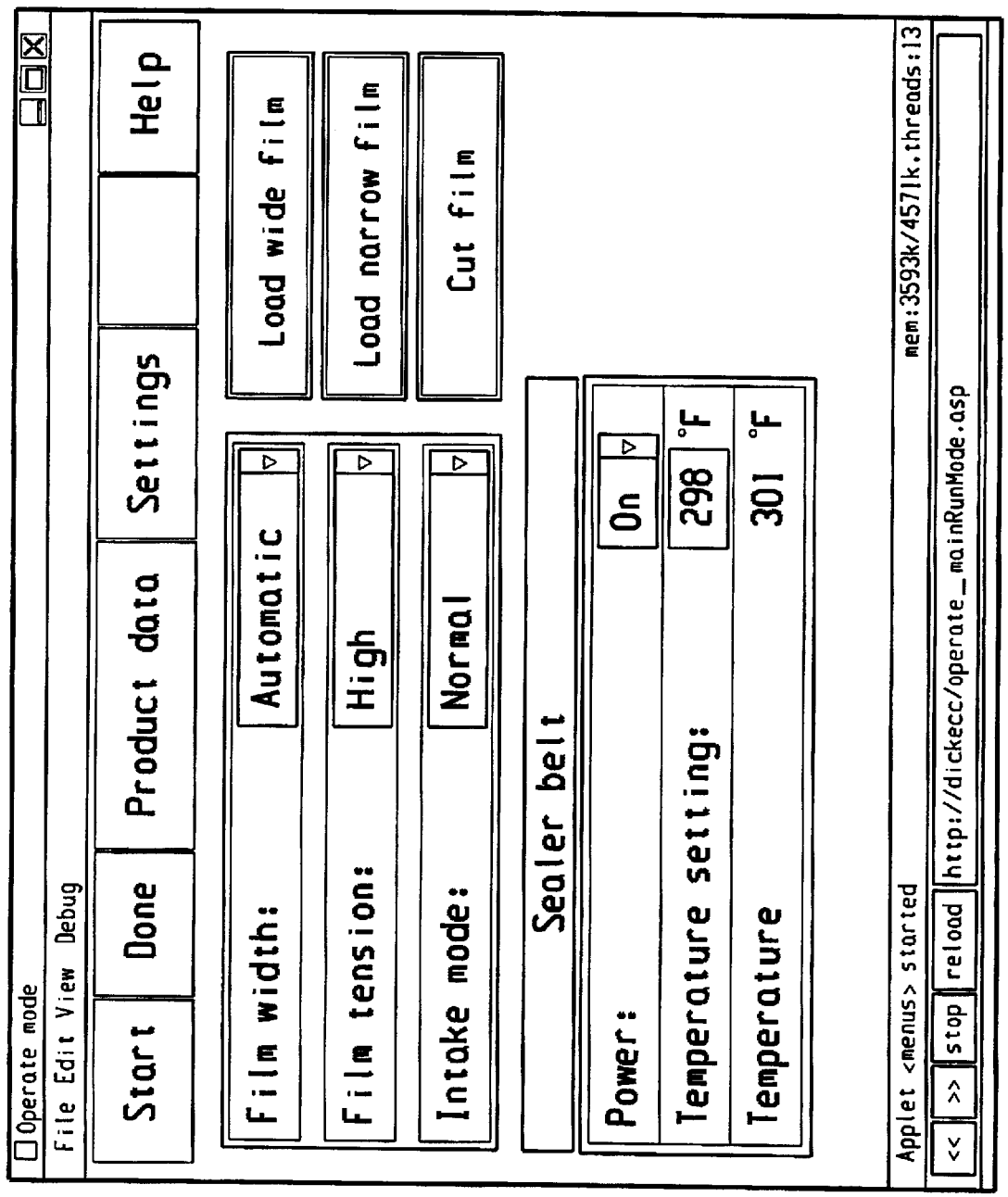
FIG. 23 is an exemplary user interface display providing functionality for wrapping machine control.

For example, as previously mentioned interactive web pages could be served to allow a user in a supervisor mode or service mode to change settings for a piece of equipment to which the scale is connected. FIG. 22 shows an exemplary scale 10 connected to a package wrapper 100. The link from the wrapper to the scale is typically a hard-line communication link but could be wireless. FIG. 23 shows an exemplary interactive web page that can be provided to enable settings on the wrapper 100, such as film width, film tension, intake mode (e.g. manner in which packages we received for wrapping), and sealing belt parameters. Settings of other peripheral devices could be adjusted in a similar manner. For example, in the case of a peripheral label applier that may or may not be associated with a wrapper, FIG. 9 shows a web page that could be used to control operation of the label applier.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A scale for weighing an item and determining a price for the item, comprising:

a weighing station for receiving the item, the weighing station producing at least one weight indicative signal;

a scale controller for receiving the weight indicative signal and determining the price for the item based upon the weight indicative signal;

a resident interface link including an associated display screen;

a remote interface link for providing remote access by external devices; and a resident web server associated with the controller for serving user interface web page data to both of (1) the resident interface link for display on the display screen and (2) the remote interface link for transfer to an external device.

2. The scale of claim 1 wherein the resident interface link includes web page viewing software and the remote interface link includes communication software.

3. The scale of claim 2 wherein the remote interface link further includes one of a hardware interface port and a wireless communication unit.

4. The scale of claim 2 wherein the web page viewing software comprises a web browser.

5. The scale of claim 4 wherein the web browser is functional with the remote interface link for enabling a resident user to connect with external web servers.

6. The scale of claim 1 wherein the controller and resident web server are operable together in at least one mode to serve similar web page data to both the resident interface link and the remote interface link for enabling remote viewing of on-going scale operations in real time.

7. The scale of claim 6 wherein certain of the similar web page data is interactive when served to the resident interface link and is view only when served to the remote interface link.

8. The scale of claim 1 wherein the controller and resident web server are operable together in at least one mode to serve first web page data to the resident interface link and second web page data to the remote interface link.

9. The scale of claim 1 wherein the controller includes login control software accessed through the resident web server for limiting web page data served to the resident interface link and the remote interface link.

10. The scale of claim 9 wherein the login control software includes at least a first level login for basic scale operations and a second level login for performing monitoring functions.

11. The scale of claim 9 wherein the login control software includes at least a first level login for basic scale operations and a second level login for performing service functions.

12. The scale of claim 9 wherein a given user's login level is established according to entered login information of the user.

13. The scale of claim 1 wherein the user interface web page data comprises one or more of HTML, Javascript, ASP, and Java Applets.

14. A scale for weighing an item and determining a price for the item, comprising:
a weighing station for receiving the item, the weighing station producing at least one weight indicative signal;
a scale controller for receiving the weight indicative signal and determining the price for the item based upon the weight indicative signal;
a remote interface link for providing remote access by one or more remote devices; and
a resident web server associated with the controller for serving user interface web page data to the remote interface link for transfer to an external device, including web page data for establishing a link enabling control of one or more functions of the scale.

15. The scale of claim 14 wherein the remote interface link includes associated communication software.

16. The scale of claim 14 wherein the controller includes login control software accessed through the resident web server for controlling web page data served to the remote interface link.

17. The scale of claim 16 wherein the login control software includes at least a first level login and a second level login.

18. A system for use in weighing items and determining prices for weighed items, comprising:
a scale according to claim 14;
a store computer network, the remote interface link of the scale connected to the store computer network, the store computer network including at least one computer connected thereto and having a web browser associated therewith;
wherein the computer web browser connects to the scale resident web server by pointing to a network address assigned to the scale resident web server.

19. The system of claim 18, further comprising:
an Internet access gateway associated with the store computer network for enabling the scale to be accessed by web browsers over the Internet.

20. The system of claim 18 wherein the scale further includes a resident interface link including web page viewing software and an associated display screen, and wherein the controller and resident web server are operable together in at least one mode to serve similar web page data to both the resident interface link and the remote interface link for enabling remote viewing of on-going scale operations in real time.

21. The system of claim 20 wherein certain of the similar web page data is interactive when served to the resident interface link and is view only when served to the remote interface link.

22. A system for use in weighing items and determining a price for weighed items, comprising:
a plurality of scales according to claim 14;
a store computer network, the remote interface link of a multiplicity of the scales connected to the store computer network via there respective remote interface links, the store computer network including at least one computer connected thereto and having a web browser associated therewith;
each of the multiplicity of scales including a respective network address assigned thereto;
wherein the computer web browser connects to a given one of the multiplicity of scales by pointing the computer web browser to the assigned network addresses of the given one of the multiplicity of scales.

23. A method for interfacing users of a scale both at the scale and remotely, the scale operable for weighing and determining prices of items, the method comprising the steps of:
providing the scale with a weigh station and a control for determining a price of an item based upon item weight;
providing in the scale a web server;
providing in the scale a resident interface display screen;
providing in the scale a remote interface link;
serving user interface web page data from the web server for display on the resident interface display screen; and
serving user interface web page data to the remote interface link for transfer to a remote device.

24. A method for remotely assisting a scale operator in troubleshooting a certain scale configured to weigh and determine a price for items, the scale including a resident web server and an associated remote interface link connected to a network and a resident interface display, the method comprising the steps of:
communicating with the scale operator;
identifying a network address associated with the certain scale;

remotely connecting to the scale using a web browser by pointing to the identified network address;

receiving an interactive login web page served by the resident web server of the scale;

logging in to the scale via the remote connection; and after logging in, observing operator actions on the scale by receiving web page data similar to that displayed on the resident interface display of the scale in order to identify possible operator procedural errors and scale malfunctions.

25. The method of claim 24, further comprising the steps of:

in the case of observing an operator procedural error, advising the operator of both the operator procedural error and of a proper procedure.

26. The method of claim 25 further comprising the step of:

in the case of observing a scale malfunction, receiving an interactive web page from the scale and using the interactive web page for adjusting one or more scale settings.

27. The method of claim 26 wherein the scale is connected to an associated wrapper mechanism and the interactive web page enables adjustment of at least one wrapper setting.

28. The method of claim 24 wherein certain of the similar web page data is interactive as displayed on the resident interface display and is view only when served to the remote interface link.

29. The method of claim 24 wherein the communicating step involves one of receiving an electronic communication from the scale operator and receiving a telephone call from the scale operator.

30. A method for monitoring operations of a certain scale configured to weigh and determine a price for items, the scale including a resident web server and an associated remote interface link connected to a network, the method comprising the steps of:

identifying a network address associated with the certain scale;

remotely connecting to the scale using a web browser by pointing to the identified network address;

receiving at least one interactive login web page served by the resident web server of the scale;

logging in to the scale via the remote connection; and receiving automatically provided web page data via the remote connection, the web page data being updated in real time to reflect on-going operations of the scale.

31. The method of claim 30 wherein the scale further includes a resident interface link, the scale serving similar web page data to the resident interface link and the remote interface link during monitoring.

32. The method of claim 31 wherein at least some of the similar web page data is served to the resident interface link in an interactive format and to the remote interface link in a view only format.

33. A scale for weighing an item and determining a price for the item, comprising:

a weighing station for receiving the item, the weighing station producing at least one weight indicative signal;

a scale controller for receiving the weight indicative signal and determining the price for the item based upon the weight indicative signal;

a resident interface link including an associated display screen and a web browser;

a resident web server associated with the controller;

wherein during a start-up operation of the scale a user interface presented on the display screen is produced as a result of user interface web page data served by the resident web server to the web browser.

34. The scale of claim 33 wherein during the start-up operation the web browser automatically requests a certain web page from the resident web server in order to produce the user interface.

35. The scale of claim 34 wherein user interface web page data associated with the certain web page includes an applet that is loaded into the web browser and that makes a connection with a session manager associated with the controller.

36. The scale of claim 33 further including a remote interface link, wherein the resident web server operates to serve user interface web page data to the remote interface link when a request is made via the remote interface link.

* * * * *